United States Patent [19]

Sano et al.

[11] Patent Number: 4,552,114
[45] Date of Patent: Nov. 12, 1985

[54] APPARATUS FOR CONTROLLING THE NUMBER OF OPERATIVE CYLINDERS OF A DIESEL ENGINE

[75] Inventors: Yukinori Sano, Katsuta; Yoshikazu Hoshi, Ibaraki; Ikuo Takahashi, Katsuta, all of Japan

[73] Assignees: Hitachi, Ltd.; Hitachi Automotive Engineering Co., Ltd., both of Tokyo, Japan

[21] Appl. No.: 685,258

[22] Filed: Dec. 24, 1984

Related U.S. Application Data

[63] Continuation of Ser. No. 601,654, Apr. 18, 1984, abandoned, which is a continuation of Ser. No. 413,127, Aug. 30, 1982, abandoned.

[30] Foreign Application Priority Data

Sep. 2, 1981 [JP] Japan .................. 56-138845

[51] Int. Cl.⁴ ............... F02M 69/00; F02M 63/02
[52] U.S. Cl. .................... 123/481; 123/455; 123/198 F
[58] Field of Search .......... 123/481, 455, 198 F; 364/431, 371

[56] References Cited

U.S. PATENT DOCUMENTS

| | | | |
|---|---|---|---|
| 2,875,742 | 3/1959 | Dolza | 123/481 |
| 3,703,888 | 11/1972 | Eckert et al. | 123/455 |
| 3,896,779 | 7/1975 | Omori et al. | 123/481 |
| 4,040,395 | 8/1977 | Demetrasai | 123/481 |
| 4,103,655 | 8/1978 | Coles | 123/481 |
| 4,132,195 | 1/1979 | Bianchi et al. | 123/455 |
| 4,172,434 | 10/1979 | Coles | 123/481 |
| 4,249,374 | 2/1981 | Sugusawa et al. | 123/198 F |
| 4,274,382 | 6/1981 | Sugasawa et al. | 123/481 |
| 4,398,520 | 8/1983 | Schulz et al. | 123/198 F |

Primary Examiner—Raymond A. Nelli
Attorney, Agent, or Firm—Antonelli, Terry & Wands

[57] ABSTRACT

To improve the operating efficiency of a diesel engine, a plurality of engine operating parameters are detected and the engine cylinders to which the fuel supply is to be cut off are computed in accordance with the operating parameters, thereby stopping the generation of fuel control pulses in response to crank angle sensor output pulses indicative of the computed cylinders. A fuel injection pump is so constructed that the fuel is metered in response to the fuel control pulses and the metered fuel is pressurized, compressed and distributed to the cylinders, and the distribution of the pressurized and compressed fuel to the cylinders is stopped by stopping the application of the fuel control pulses.

6 Claims, 14 Drawing Figures

APPARATUS FOR CONTROLLING THE NUMBER OF OPERATIVE CYLINDERS OF A DIESEL ENGINE

This is a continuation of application Ser. No. 601,654 filed Apr. 18, 1984 which is a continuation of Ser. No. 413,127 filed Aug. 30, 1982, both now abandoned.

The present invention relates to an apparatus for controlling the injection of fuel into a Diesel engine and, more particularly, to an apparatus for controlling the number of operative cylinders of a Diesel engine using a distribution type fuel injection means.

In the past, the amount of fuel supplied by a distribution type fuel injection pump has been controlled collectively with respect to all the cylinders and it has been impossible for the electronically controlled fuel injection pumps to control the fuel injection quantity separately for each of the cylinders. Also, regarding the control of the number of the operative cylinders, various methods have been used with gasoline automobiles and they include, for example, the method of simultaneously closing the intake and exhaust valves by solenoids and stopping the operation of the cylinders and the exhaust recirculation method in which the fuel cut-off and ignition interruption are effected on the cylinders to be stopped and the exhaust gases from the operating cylinders are circulated to the stopped cylinders. In addition, a fuel injection cut-off method for cutting off the fuel supply has been under study.

In the case of the Diesel engines, however, no study has ever been made to vary the number of cylinders to be used in accordance with variations in the engine operating conditions. Moreover, none of the electronically operated distribution fuel injection pumps known in the art have been suitable for this purpose nor have been capable of positively cutting off the fuel supply to selected ones of the cylinders.

It is therefore the primary object of the present invention to provide an apparatus which controls the number of operative cylinders of a Diesel engine in accordance with the engine operating conditions.

In accordance with the present invention there is provided a control apparatus comprising a fuel injection pump whose injection quantity is determined in accordance with the open duration of an electromagnetic valve, a control circuit for detecting the operating conditions of a Diesel engine to determine the number of cylinders to be operated, a register for storing the cylinder control data from the control circuit, and a pulse generating circuit responsive to cylinder pulses synchronized with the shaft rotation of the Diesel engine and the stored value of the register to control the application of valve opening pulses to the electromagnetic valve, whereby the number of the Diesel engine cylinders to be operated is controlled in accordance with the engine operating conditions. In this way, the desired control is effected efficiently in accordance with the engine operating conditions.

The present invention will become more apparent from the following description taken in conjunction with the accompanying drawings, in which.

Figure 1:
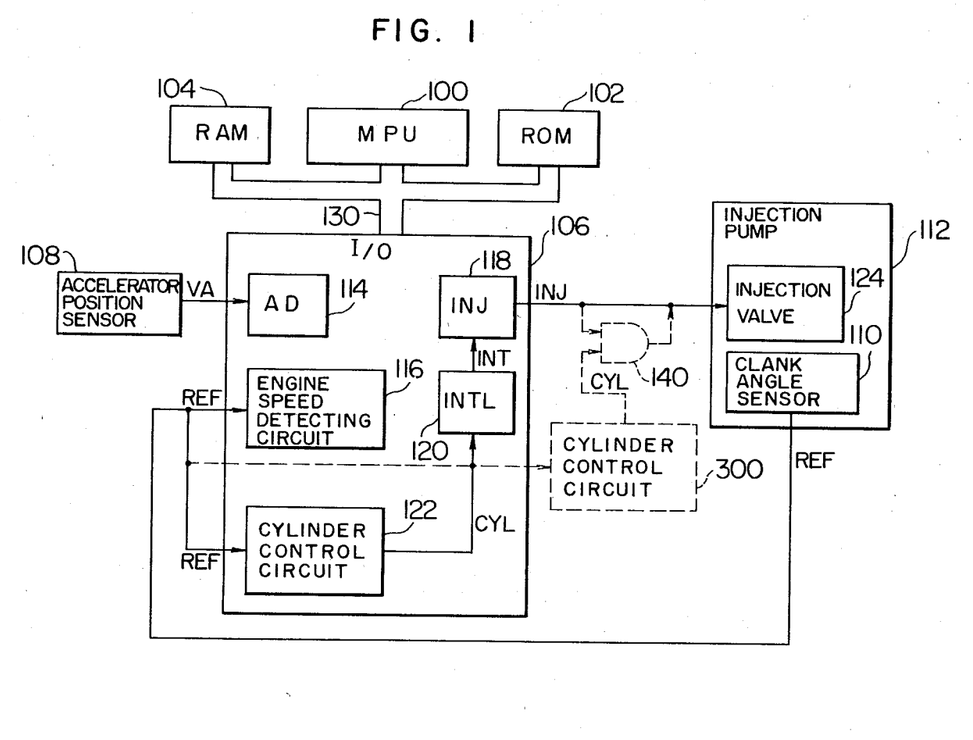
FIG. 1 is a block diagram showing the basic construction of a control apparatus according to an embodiment of the invention.

As shown in FIG. 1, the control apparatus comprises a microprocessor MPU 100, a read-only memory ROM 102, a random-access memory RAM 104, an input/output circuit 106 (e.g., the Hitachie HD 46506), sensors 108 and 110 and a fuel injection pump 112. The input/output circuit 106 comprises an analog-to-digital converter 114, an engine speed detecting circuit 116, a cylinder control circuit 122, an INT pulse generating circuit 120 and a fuel injection pulse generating circuit 118. The sensor 108 includes for example, a potentiometer which generates an analog voltage VA corresponding to an accelerator position. The analog voltage VA is converted to a digital signal $\theta AC$ by the A-D converter 114, taken by the microprocessor 100 and stored in the RAM 104.

Figure 2:
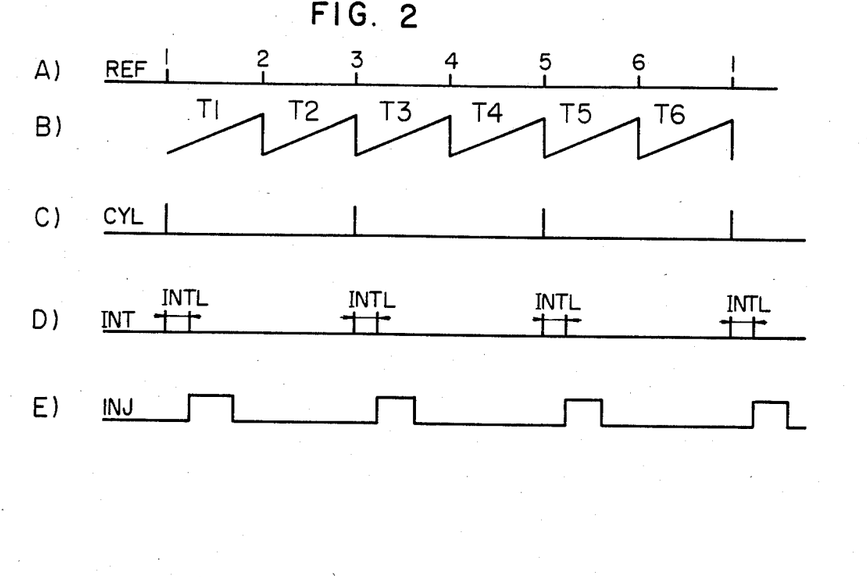
FIG. 2 is a timing chart for the operation of the apparatus of FIG. 1.

The injection pump 112 includes the crank angle sensor 110 for generating cylinder cycle indicative pulses REF in synchronism with the rotation of the engine shaft and the pulses shown in (A) of FIG. 2 are generated in correspondence to the Nos. 1 to 6 cylinders. The pulses REF are applied to the engine speed detecting circuit 116. The circuit 116 counts clocks by a counter so that the periods $T_1$ to $T_6$ of the respective cylinder pulses are detected and the period T is applied to the microprocessor MPU 100. The period T is the reciprocal of the engine speed and the MPU 100 computes an engine speed N from the period T and stores it in the RAM 104.

In response to the accelerator position and the engine speed N, the MPU 100 computes the desired fuel supply quantity and cylinder control data in accordance with the various program stored in the ROM 102 and the results are respectively set in the fuel injection pulse generating circuit 118 and the cylinder control circuit 122. Also, a constant value INTL is set in the INT pulse generating circuit 120. The RAM 104 is used for storing the working data required for the said computations. The transmission of the various data between the MPU 100, the ROM 102, the RAM 104 and the input/output circuit 106 is effected through a bus 130 including a data bus and an address bus.

FIG. 2 is a timing chart for explaining the operation of the blocks in FIG. 1 and the cylinder control circuit 122 is responsive to the pulse REF shown in (A) to generate the pulse CYL shown in (C). The pulse CYL is generated in response to the pulse REF in (A) and which of the REF pulses 1 to 6 corresponds to the CYL pulse is determined in accordance with the cylinder control data set in the cylinder control circuit 122. In the illustration of FIG. 2, the CYL pulses are generated in correspondence to the REF pulses 1, 3 and 5. This means that only the three cylinders of the six-cylinder engine, i.e., the Nos. 1, 3 and 5 cylinders are used to operate the engine and the operation of the remaining Nos. 2, 4 and 6 cylinders is stopped. The CYL pulse is applied to the INT pulse generating circuit 120 thereby generating a pulse INT which is shifted from the CYL pulse by a given amount INTL. This INT pulse is applied as a trigger pulse to the INJ pulse generating circuit 118 which, in turn, generates an INJ pulse for operating a fuel injection valve 124. In other words, the cylinder control circuit 122 controls the corresponding relation between the REF pulses and the CYL pulses thereby controlling the number of the operative cylinders of the engine.

Figure 3:
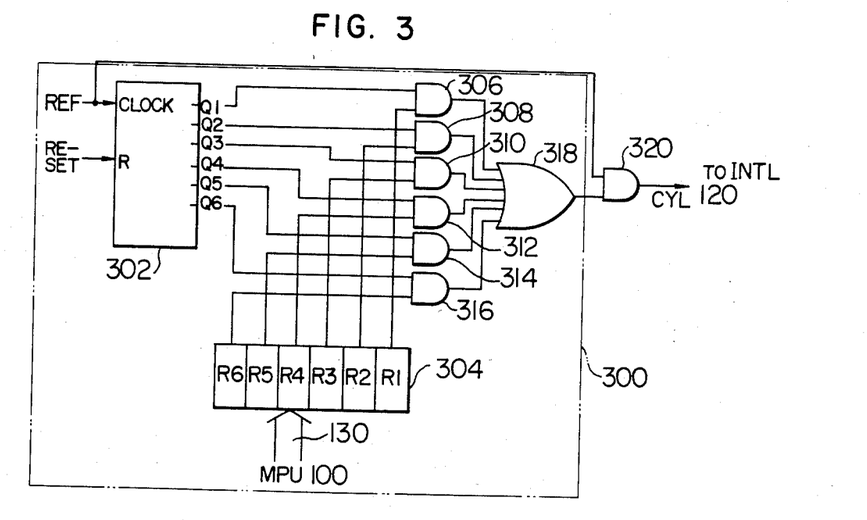
FIG. 3 is a circuit diagram of the cylinder control circuit shown in FIG. 1.
Figure 4:
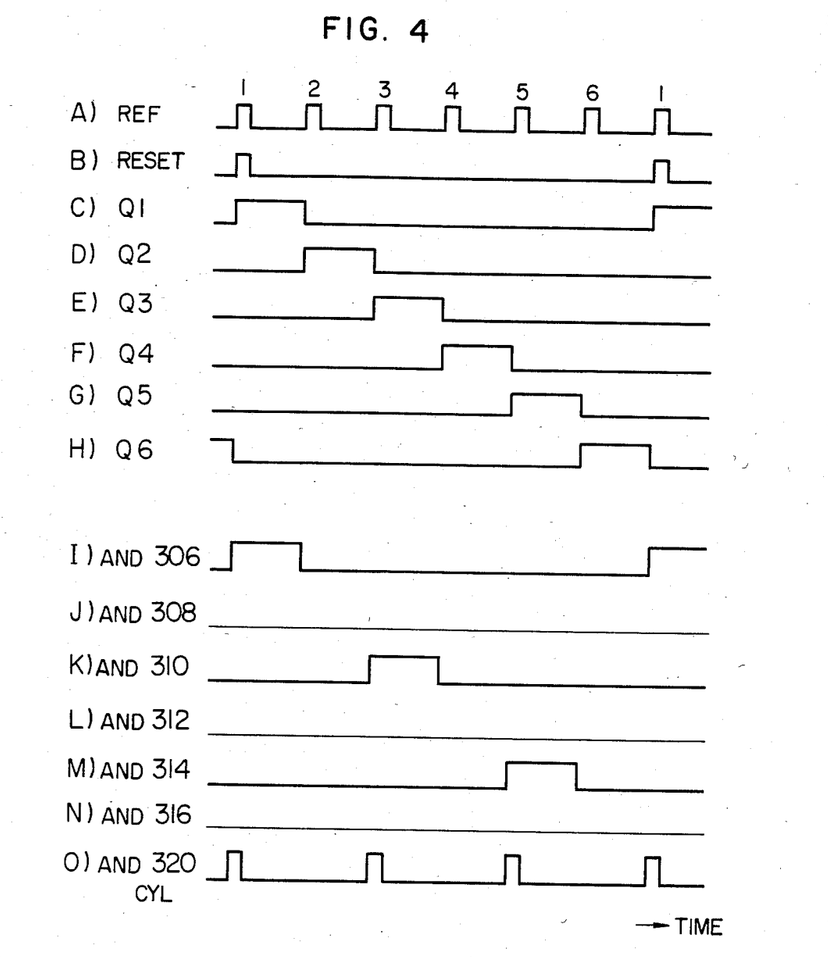
FIG. 4 is a timing chart for explaining the operation of the circuit of FIG. 3.

As shown in FIG. 3, the cylinder control circuit 122 comprises a ring counter 302, a register 304, AND gates 306, 308, 310, 312, 314 and 316, an OR gate 318 and an AND gate 320. The REF pulses applied to the ring counter 302 are cylinder pulses so that for a six-cylinder Diesel engine six pulses are generated at intervals of an equal angle for every two revolutions of the engine shaft as shown in (A) of FIG. 2. The ring counter 302 counts the REF pulses to generate pulses $Q_1$ to $Q_6$. Shown in (A) of FIG. 4 are the REF pulses shown in (A) of FIG. 2 and the REF pulses 1 to 6 are generated in synchronism with the Nos. 1 to 6 cylinders of the Diesel engine. In response to the REF pulses 1 to 6, the $Q_1$ to $Q_6$ pulses shown respectively in (C) to (H) of FIG. 4 are generated from the ring counter 302 and are applied to the AND gates 306, 308, 310, 312, 314 and 316, respectively.

Shown in (B) of FIG. 4 is a signal for resetting the ring count 302 and the ring counter 302 is reset by an REF pulse indicative of the No. 1 cylinder. In fact, however, the number of shift stages of the ring counter 302 corresponds to the number of engine cylinders so that once the ring counter 302 is reset at the beginning, it operates properly and there is no need to particularly reset it repeatedly. In accordance with this embodiment, the ring counter 302 is reset each time so as to prevent any erroneous operation due to noise.

On the other hand, the cylinder control data computed by the MPU 100 is applied to the bits $R_1$ to $R_6$ of the register 304 through the bus 130. Assuming now that the cylinder control data is 101010, the data 101010 is stored in the bits $R_1$ to $R_6$ of the register 304. Thus, as shown in (I) to (N) of FIG. 4, only the AND gates 306, 310 and 314 generate output pulses and the AND gates 308, 312 and 316 do not transmit any pulses. The outputs of the AND gates 306, 308, 310, 312, 314 and 316 are each applied to the AND gate 320 via the OR gate 318 and is ANDed with the REF pulse to generate a pulse. As a result, the pulses shown in (O) of FIG. 4 are generated from the AND gate 320 and are applied to the INT pulse generating circuit 120 of FIG. 1.

Figure 5:
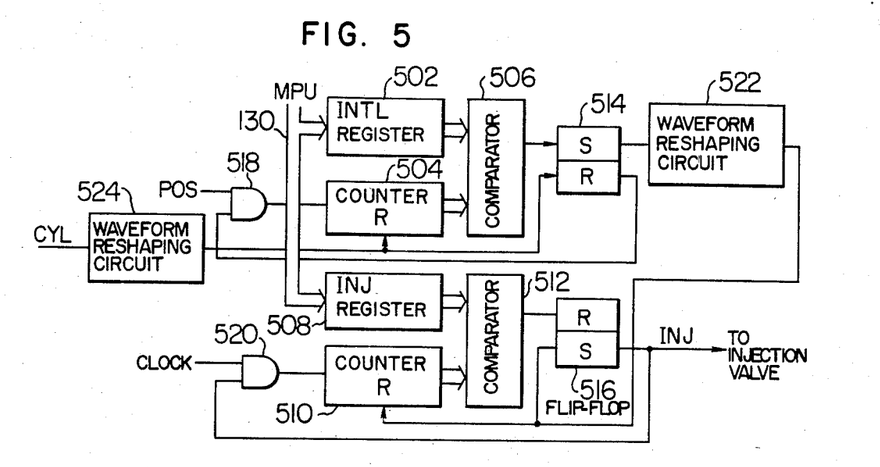
FIG. 5 is a circuit diagram of the INT pulse generating circuit and the INJ pulse generating circuit of FIG. 1.
Figure 6:
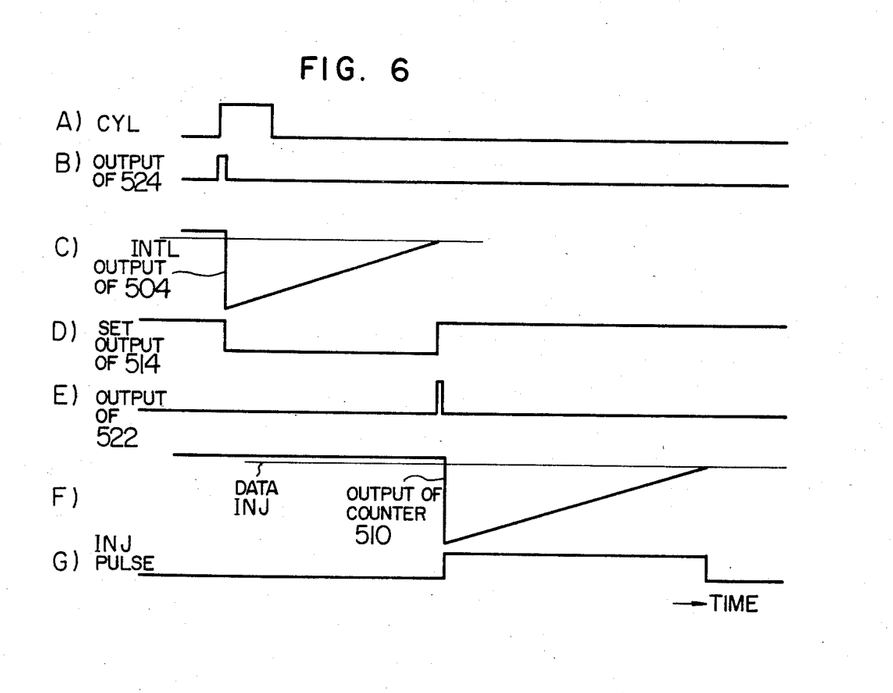
FIG. 6 is a timing chart for the operation of the INT pulse generating circuit and the INJ pulse generating circuit.

FIG. 5 is a detailed circuit diagram of the INT pulse generating circuit 120 and the INJ pulse generating circuit 118 of FIG. 1 and FIG. 6 is a waveform diagram for explaining the operation of these circuits. When the CYL pulse shown in (A) of FIG. 6 is applied to a waveform reshaping circuit 524, the pulse shown in (B) of FIG. 6 is generated and thus a counter 504 and a flip-flop 514 are reset. When the flip-flop 514 is reset, an AND gate 518 comes into operation so that clocks POS are applied to the counter 504 and it counts up. The clock POS is a pulse indicative for example of a unit rotational angle of 2° of the engine shaft and it is sent from a crank angle sensor which is not shown. The shift value INTL is applied to a register 502 and thus the output of the counter 504 is compared with the data INTL by a comparator 506. When the output of the counter 504 becomes equal to the data INTL or the output of the register 504 as shown in (C) of FIG. 6, the flip-flop 514 is set as shown in (D) of FIG. 6 and the pulse shown in (E) of FIG. 6 is generated from a waveform reshaping circuit 522. On the other hand, the AND gate 518 is rendered inoperative and the application of clocks POS to the counter 504 is stopped. This has the effect of preventing any erroneous operation due to overflowing of the counter 504.

The output of the waveform reshaping circuit 522 sets a flip-flop 516 thereby generating the INT pulse shown in (G) of FIG. 6 and also resets a counter 510 as shown in (F) of FIG. 6. When the flip-flop 516 is set, an AND gate 520 comes into operation so that a clock generated at intervals of a given time is applied to a counter 510 via the AND gate 520. The data INJ indicative of the INJ pulse duration is stored in a register 508 and thus the output of the counter 510 is compared with the data INJ by a comparator 512. When the output of the counter 510 becomes equal to the data INJ or the output of the register 508, the flip-flop 516 is reset and the pulse INJ is cut off. Also, the AND gate 520 comes out of operation and the application of clocks to the counter 510 is stopped. This prevents overflowing of the counter 510. The pulse INJ is applied to the injection valve 124 of the injection pump 112.

Figure 7:
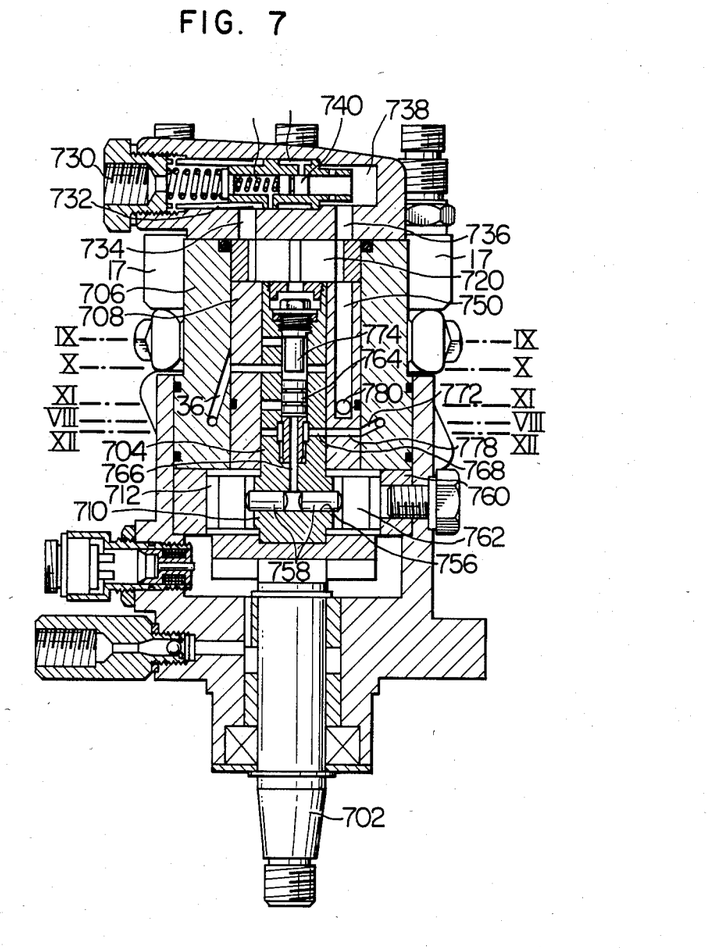
FIG. 7 is a vertical sectional view of the fuel injection valve shown in FIG. 1.

As shown in FIG. 7, the fuel injection valve 112 of FIG. 1 includes a rotary distributor 704 positioned centrally in the injection pump 112 and coupled to the engine shaft through a shaft 702, is rotatably disposed in a sleeve 708 which is force fitted and firmly positioned in a cylindrical body 706. Disposed at the lower end of the rotary distributor 704 is a pressure pump comprising a rotor 710, a roller 712 and an annular cam 760. Also, a vane type supply pump 720 is disposed at the upper end of the rotary distributor 704.

The fuel is supplied from a fuel tank to an inlet port 730 in the upper part of the injection pump and the fuel is supplied to the vane type pump 720 through a passage 734 and a filter 732. The fuel from the vane type pump 720 is supplied to a passage 750 and a part of the fuel is returned to a chamber 738 via a passage 736. When a piston 740, pressed by a spring 741, is urged against the spring 741 by the fuel in the chamber 738, a passage 742 is communicated with the chamber 738 and thus the fuel in the chamber 738 is returned to the fuel tank.

The rotor 710 is formed with a transverse hole 756 and a pair of plungers 758 are received within the transverse hole 756. When the rotary distributor 704 is rotated, the pair of plungers 758 are moved through the roller 712 and a roller support 762 by the action of the annular cam 760 disposed in the lower part of the body 706. This compresses the fuel within the fuel passage formed centrally in the rotary distributor 704 and a shuttle 764 is urged upwardly.

A longitudinal passage 766 formed centrally in the rotary distributor 704 is communicated at its lower end with the transverse hole 756 and the shuttle 764 is slidably disposed in the longitudinal passage 766. The amount of movement of the shuttle 764 is regulated by the amount of fuel supplied to the passage 766 through passages 768, 770 and 772 and a pair of upper and lower stoppers 774.

Figure 8:
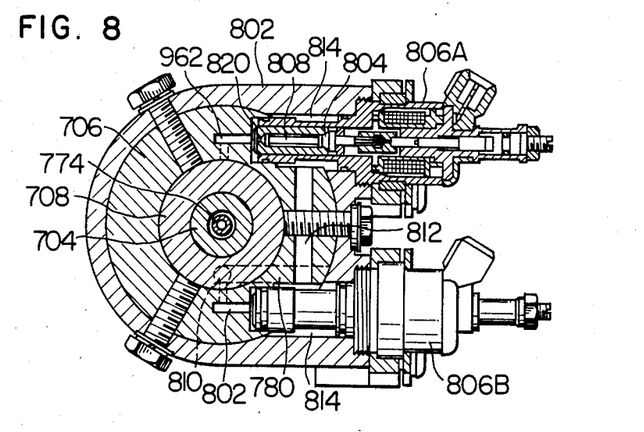
FIG. 8 is a sectional view taken along the line A—A of FIG. 7.

As shown in FIG. 8, the lower stopper 774 is disposed in the center hole of the rotary distributor 704 and the rotary distributor 704 is rotatable within the central hole of the sleeve 708 fixedly positioned in the body 706. The body 706 is enclosed by a case 802 and is integral with an electromagnetic valve 806A mounted at the right end of a valve hole 804. Numeral 808 designates a valve stem, 810 an outlet passage shown by the broken line, 780 a transverse hole communicated with the outlet passage 810, and 812 a transverse hole communicating a suction space 814 with the passage 780. Numeral 820 designates an orifice opposing the valve stem 808 and communication with an injection communication port is provided by way of the orifice 820.

The fuel supplied from the electromagnetic valve 806A is pressurized by the shuttle 764 of FIG. 7 and is supplied through distribution outlets 792, 794 and 796 to the corresponding cylinders. The timing of the pressurization is determined by the amount of fuel supplied from an electromagnetic valve 806B.

Figure 9:
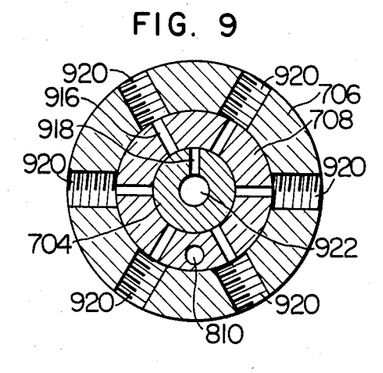
FIG. 9 is a sectional view taken along the line B—B of FIG. 7.

As shown most clearly in FIG. 9, when the rotary distributor 704 is rotated, a delivery passage 918 is selectively aligned with a plurality of delivery ports 916 formed in the sleeve 708 and the delivery ports 916 are each connected with a mounting hole of a pressure valve 920 so that the pressurized fuel in a working chamber 922 is distributed and supplied to the six cylinders of the Diesel engine. In other words, the fuel is supplied to each of the six cylinders for every rotation of the rotary distributor 704.

Figure 10:
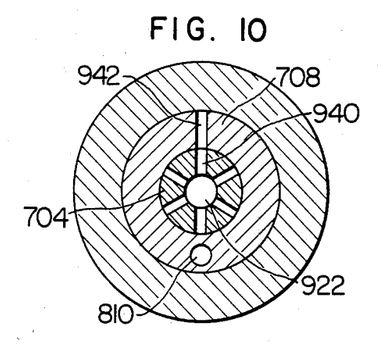
FIG. 10 is a sectional view taken along the line C—C of FIG. 7.

As shown in FIG. 10, the rotary distributor 704 is formed with six inlet passages 940 which are arranged at intervals of an equal angle and communicated with the working chamber 922. The sleeve 708 is formed with a single inlet port 942 arranged so that the inlet port 942 is communicated with the inlet passages 940 at least when the delivery passage 918 is not in alignment with the delivery ports 916.

Figure 11:
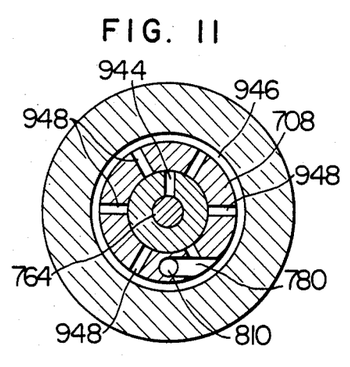
FIG. 11 is a sectional view taken along the line D—D of FIG. 7.

As shown in FIG. 11, the outer diameter of the sleeve 708 is reduced to form a fuel sump groove 946 and a plurality of escape ports 948 are arranged at intervals of an equal angle to communicate with the fuel sump groove 946. In other words, the escape passage 944 communicates with each of the six escape ports 948 for every rotation of the rotary distributor 704 so that the fuel is gathered in the sump groove 946 and any extra fuel is discharged through the transverse hole 780 and the outlet passage 810.

Figure 12:
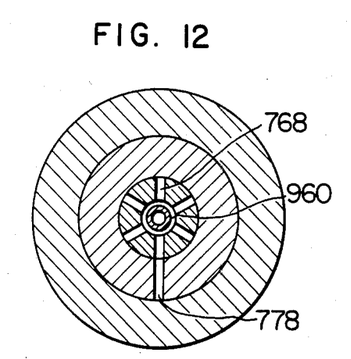
FIG. 12 is a sectional view taken along the line E—E of FIG. 7.

The rotary distributor 704 is, as shown in FIG. 12, formed with the six injection timing adjusting passages 768 arranged at intervals of an equal angle and these passages 768 are successively communicated, with the passage 778.

With the fuel injection pump constructed as described above, when the shuttle 764 comes near to the delivery passage 918, the inlet port 942 is aligned with one of the inlet passages 940. As a result, the electromagnetic valve 806A is operated so that the valve stem 808 is opened and the fuel in the suction space 814 reaches the delivery port 916 through the valve hole 804, the orifice 820 and an injection communication port 962 thereby delivering the injection fuel to the working chamber 922 on the side of the delivery passage 918. The fuel delivered into the working chamber 922 moves the shuttle 764 toward the transverse hole 780 and thus the fuel is supplied to each of the engine cylinders from the working chamber 922 through the pressure valves 788 of FIG. 7.

The shuttle 764 is moved so long as the escape passage 786 is covered by the rear side of the shuttle 764, and when the escape passage 786 is not covered, the shuttle 764 is stopped from moving any further and the fuel remaining in the pressure pump chamber 766 flows to the outlet passage 810 thorugh the escape passage 786 and the escape ports 948. When the rotary distributor 704 is rotating, the above-mentioned cycle is automatically repeated.

Figure 13:
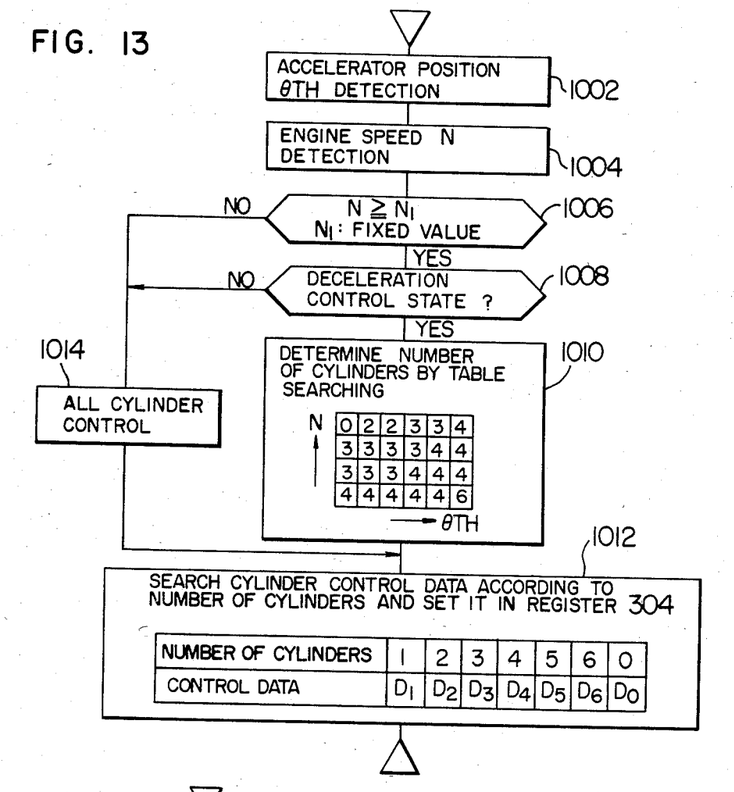
FIG. 13 is a flow chart for computing a number of cylinders control data.

In FIG. 13, steps 1002 and 1004 respectively detect an accelerator position $\theta$TH and an engine speed N as engine condition indicative parameters. A step 1006 determines whether the engine speed N is greater than a given value $N_1$ so that if it is, the step 1006 transfers to a step 1008 for controlling the number of cylinders. The step 1008 determines whether there is a deceleration condition so that it transfers to a step 1010 only when there exists a deceleration condition. When the conditions of the steps 1006 and 1008 are not satisfied, a transfer is made to a step 1014 for effecting a normal operation control by which all the cylinders are operated. The step 1014 selects the number of the cylinders in the engine, i.e., the number 6 in this embodiment and then transfers to a step 1012. The step 1010 searches a table showing the numbers of operative cylinders as functions of the engine parameters N and $\theta$TH and determines the number of operative cylinders corresponding to the engine operating condition. The table is stored in the ROM 102. If the step 1010 searches the number 0, it means that the fuel supply to all the cylinders is cut off. If the number four is searched, it means that the fuel is supplied only to the four of the six cylinders. If the number six is searched, it means the ordinary control which supplies the fuel to all the cylinders. Thus, in accordance with the searched number of cylinders the step 1012 determines by table searching a control data indicating which of the six cylinders are to be operated and sets the same in the register 304. When the number of cylinders is 0, the corresponding control data is 000000, and the control data corresponding to the numbers three and six are respectively 101010 and 111111.

Figure 14:
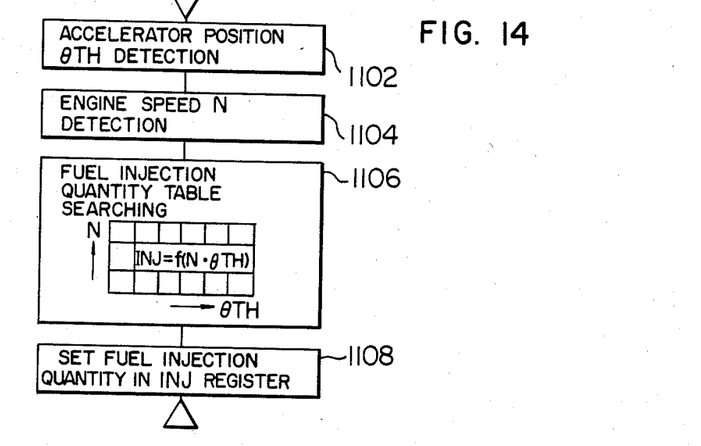
FIG. 14 is a flow chart for computing a data INJ.

FIG. 14 is a flow chart for computing a data INJ which is set in the register 508. Steps 1102 and 1104 respectively detect an accelerator position $\theta$TH and an engine speed N as engine parameters, and a step 1106 determines the desired fuel injection quantity INJ in accordance with the detected parameters N and $\theta$TH. The fuel injection quantity INJ is represented as functions of the parameters N and $\theta$TH and such fuel injection quantities INJ are stored in the form of a table in the ROM 102. The desired fuel injection quantity INJ is searched in accordance with the table. The searched fuel injection quantity INJ is set in the INJ register 508 by a step 1108. Thus, a pulse corresponding to the computed quantity INJ is supplied to the fuel injection valve 124 and the fuel is supplied to the corresponding cylinders through the fuel injection pump 112.

The broken line circuits in FIG. 1 show the principal part of another embodiment of the invention. This embodiment is so constructed that in FIG. 1 the output of the crank angle sensor 110 is applied directly to the INT pulse generating circuit 120 as shown by the broken line and the output of the INJ pulse generating circuit 118 is applied to the injection valve 124 not directly but through an AND gate 140 as shown by the broken lines. In this case, one input of the AND gate 140 receives the INJ pulse as mentioned previously and the other input receives the output of a cylinder control circuit 300. In this embodiment, all the REF pulses are applied to the INT pulse generating circuit 120 and thus the INJ pulse generating circuit 118 generates the INJ pulse corresponding to each of the REF pulses. Of these INJ pulses, only those which are enabled by the cylinder control circuit 300 are applied to the injection valve 124 via the AND gate 140. The cylinder control circuit 300 is the one shown by the dotted line 300 in FIG. 3 and the output of the OR gate 318 is applied to the AND gate 140. In other words, the pulses shown in (I) to (N) of FIG. 4 are applied to the AND gate 140. In this embodiment, the OR gate 318 generates an output only in response to each of the REF pulses 1, 3 and 5 shown in (I), (K) and (M) of FIG. 4 and only the INJ pulses corresponding to the Nos. 1, 3 and 5 cylinders are applied to the injection valve 124 through the AND gate 140. Consequently, exactly the same effects as the first embodiment are obtained.

In accordance with an apparatus of the present invention for controlling the number of operative cylinders of a Diesel engine, there is a great advantage that a fuel injection pump can be operated positively and the cylinders into which the fuel is to be injected are selected automatically in accordance with the engine operating conditions, thereby reducing the amount of fuel consumption.

We claim:

1. A fuel injection arrangement comprising a fuel injection pump, the fuel injection pump including a cylindrical body, a sleeve disposed within said cylindrical body, a rotary distributor means disposed in said sleeve and adapted to be driven by an internal combustion engine, a longitudinal path formed along an axial line of said rotary distributor means, a shuttle slidably disposed in said longitudinal path, a first electromagnetic valve means disposed at one side of said shuttle and adapted to be driven by a signal from a control circuit in order to meter and supply fuel for determining a fuel injection period, a second electromagnetic valve means disposed at the other side of said shuttle means for measuring and supplying fuel to be injected, a compression pump means disposed beneath said rotary distributor means, said compression pump means including a rotor means, roller means, plunger means, and annular cam means for compressing the fuel determining said injection period, and a distributing means disposed above said rotary distributor means for supplying the fuel to a selected fuel injection valve, wherein said shuttle is moved by an action of said compression pump by the rotation of said rotary distributor means to thereby pressurize the injection fuel, and the pressurized fuel is supplied to a selected fuel injection valve by a rotation of said rotary distributor means.

2. A fuel injection arrangement according to to claim 1, further comprising means for controlling a number of operative cylinders of the engine including
   a crank angle sensor means for generating a rotation synchronous pulse corresponding to each cylinder of said engine in synchronism with the rotation thereof;
   a fuel control pulse generating circuit responsive to said crank angle sensor means output to generate fuel control pulses having a duration corresponding to an output of said control circuit;
   memory means for storing a number of cylinders control signal determined in accordance with a plurality of engine parameters; and
   a number of cylinders control circuit responsive to said crank angle sensor means output to cut off an application of the fuel control pulses corresponding to the cylinders indicated by said number of cylinders control signal.

3. A fuel injection arrangement according to claim 2, wherein said number of cylinders control circuit includes a gate circuit responsive to said number of cylinders control signal in said memory means to selectively cut off the application of pulses corresponding to said crank angle sensor means output to said fuel control pulse generating circuit.

4. A fuel injection arrangement according to claim 2, wherein said number of cylinders control circuit includes a gate circuit responsive to said number of cylinders control signal in said memory means to selectively cut off the application of said fuel control pulses from said fuel control pulse generating circuit.

5. A fuel injection arrangement according to claim 3, wherein said number of cylinders control circuit includes a memory corresponding to a plurality of cylinders of all of the cylinders of said engine, and a coupling circuit for applying pulses responsive to said crank angle sensor means output and corresponding to said memory and a stored value of said memory to said gate circuit.

6. A fuel injection arrangement according to claim 5, wherein said number of cylinders control circuit includes a counter for counting the number of said engine cylinders whereby said crank angle sensor means output is applied to said counter to generate pulses indicative of said cylinders.

* * * * *